United States Patent [19]

Richards

[11] Patent Number: 4,582,973

[45] Date of Patent: Apr. 15, 1986

[54] APPARATUS FOR STITCH-WELDING CONTINUOUS INSULATED WIRE

[75] Inventor: Paul A. Richards, Mission Viejo, Calif.

[73] Assignee: Galt Corporation, Mission Viejo, Calif.

[21] Appl. No.: 686,373

[22] Filed: Dec. 26, 1984

[51] Int. Cl.[4] .............................................. B23K 11/32
[52] U.S. Cl. .................................... 219/56.1; 219/234
[58] Field of Search ................ 219/56.1, 56.21, 56.22, 219/85 F, 234

[56] References Cited

U.S. PATENT DOCUMENTS

| | | | |
|---|---|---|---|
| 3,089,020 | 5/1963 | Hurlebaus | 219/56.21 |
| 3,342,972 | 9/1967 | Penberg | 219/56.21 X |
| 3,369,102 | 2/1968 | Jacobs | 219/234 |
| 3,912,900 | 10/1975 | Arnett | 219/56.21 |

*Primary Examiner*—Philip H. Leung
*Assistant Examiner*—Alfred S. Keve
*Attorney, Agent, or Firm*—Francis X. LoJacono

[57] ABSTRACT

The invention relates to a hand-held welding device capable of diffusion bonding or welding to compatible metal surfaces a variety of materials including wire, metal strips, component leads, and other suitable metallic objects. The device is formed with a tubular housing in which are mounted an adjustable, outer electrode assembly and an adjustable, inner electrode assembly, the outer electrode assembly being arranged to have interchangeable, contact-probe members, and the inner electrode assembly being positioned coaxially within the outer electrode assembly. Each electrode assembly is spring-biased, the biasing force of each spring being independently adjustable to provide an optimum bonding pressure on the workpiece and the proper engagement of a pressure-sensitive switch to activate the current pulse of a power-supply unit.

6 Claims, 6 Drawing Figures

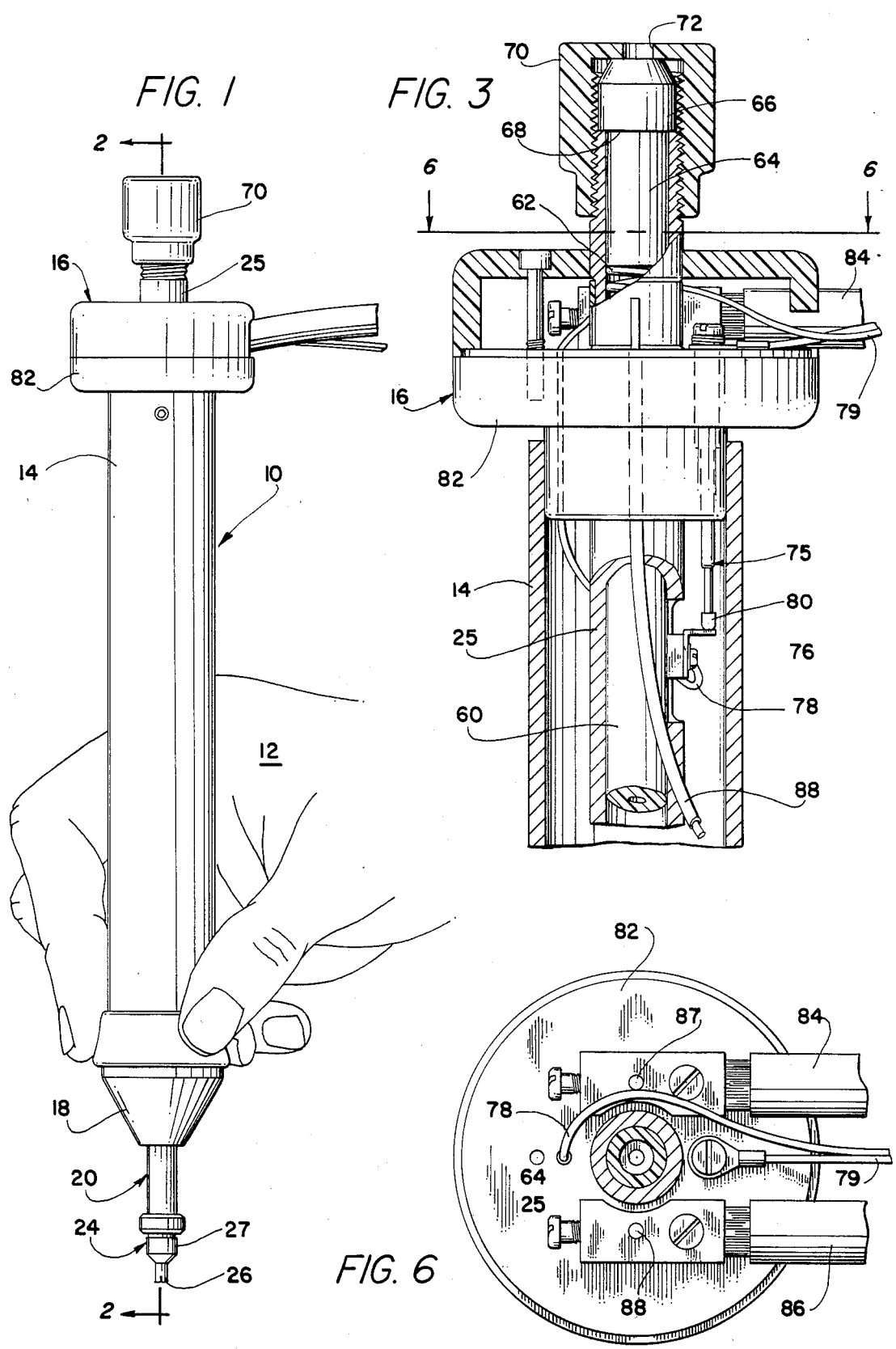

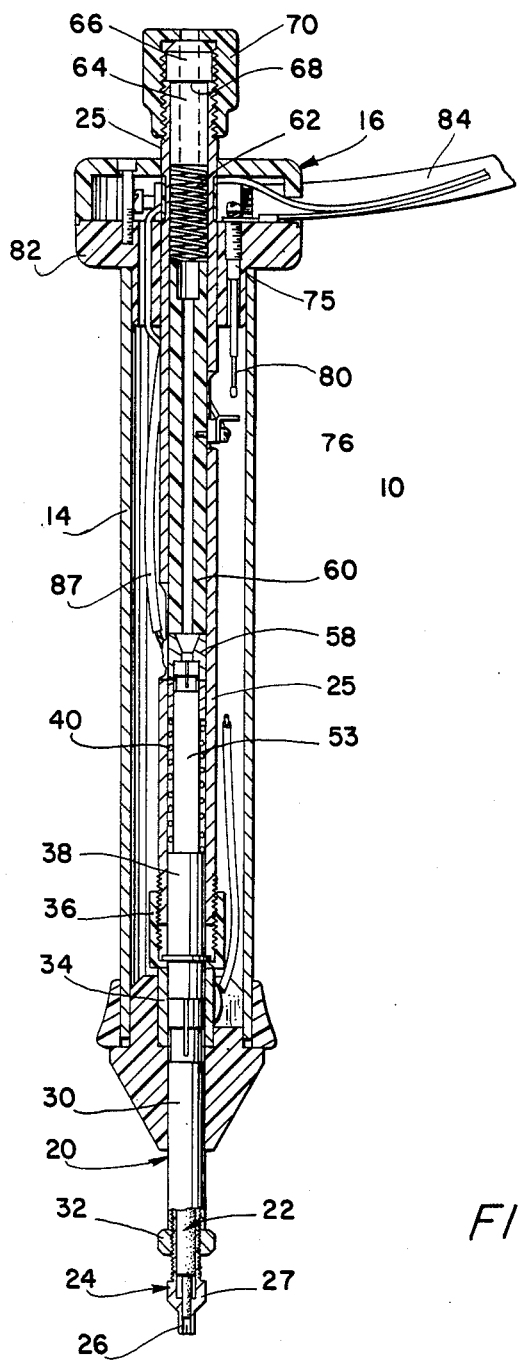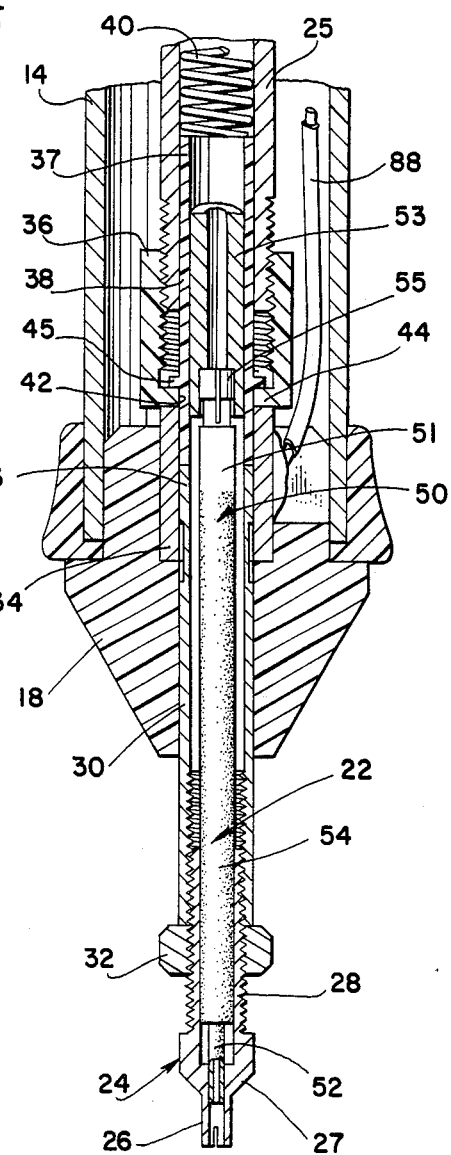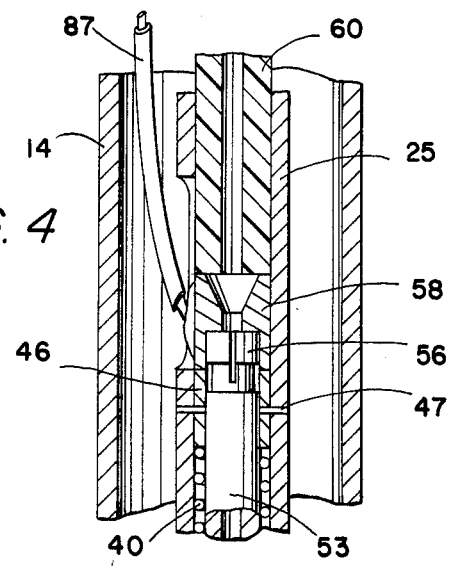

APPARATUS FOR STITCH-WELDING CONTINUOUS INSULATED WIRE

BACKGROUND OF THE INVENTION

1. Field of the Invention

This invention relates generally to a wire-welding device, and more particularly to an apparatus for stitch welding a continuous insulated wire to a plurality of terminal pins mounted on a circuit board.

2. Description of the Prior Art

It is well known in the art that various problems and difficulties are being encountered in providing suitable means for welding continuous insulated wire to various terminal pins positioned on circuit boards.

There are many well-known methods and types of wirewelding apparatuses presently in use. However, these devices have various individual features that restrict their use; and they are also complicated to operate and expensive to maintain.

Due to the highly advanced technology in the electronics field, the reliability of intricately designed circuit boards has become more critical than heretofore. A circuit board includes large numbers of closely spaced, miniature terminal pins which must be electrically interconnected by welding a continuous insulated wire from one point to another. The welding of the insulated wire is accomplished by forceably pressing the wire, with the electrode, against each terminal pin, so that it ruptures through the insulation to expose the wire for contact with the pin. Welding current is passed through the electrode to weld the central conductor of the wire to the terminal pin. Thus, it is necessary to press the electrode against the wire with great force; and at the same time wire must be accurately positioned on the pin with the wire remaining between the electrode and the terminal pin. It is a time-consuming task to precisely position the wire on the pin.

There is still a further problem that is frequently encountered in that the use of excessive pressure on the wire causes it to be scored to such an extent that a weak link is established in the wire on the weld itself. The weakening of the wire is not often recognizable and eventually this leads to a break, resulting in failure within the electronic system. On the other hand, if the weakened area is noted after the weld has already taken place, the wire must be removed from the pin without further harm to the circuit and the welding operation must be restarted. There are also times when the circuit board becomes so abused that it must be discarded.

The technology of the most commonly employed wirewelding apparatus involves sandwiching the wire and terminal pin between two opposing electrodes, with exactly the proper force required to penetrate the Teflon insulation on both sides (via cold-flowing) and establish positive electrical contact between all elements. This system involves two main mechanical components. The first is a weld-head assembly, designed to raise and lower an upper electrode at required pressures, and to trigger the electrical welding impulse at the proper time. The second is a lower electrode assembly which combines a fixed or pop-up lower electrode with a table-top working surface, in order to balance and manipulate circuit-board workpieces.

Of necessity, these mechanical elements have been packaged in the form of either large refrigerator-sized machines, which utilize computer-programmed X/Y tables, or desk-top-sized, manual, stitch-wiring machines, roughly as large and heavy as a drafting-table top. These manual devices possess inherent disadvantages, among which are the following:

1. Lack of field portability. They cannot be carried by field technicians to work sites for instant on-site repairs or modifications to boards actually installed in working equipment.
2. Locating the board precisely between the opposing electrodes is difficult and time-consuming, requiring both hands.
3. There is insufficient clearance between the open electrodes. Boards must often be unloaded (components and connectors removed) prior to processing.
4. A complex, time-consuming, weld-energy schedule must be run prior to actual operation.
5. Equipment and materials not provided with the basic unit are required in order to perform bonding (i.e., pull test gauges, etc.).
6. Bonding with this device cannot take place on boards such as backplane motherboards which are installed in racks, making manual stitch-wiring machines impractical for them.

As examples of other types of welding methods and devices, one may refer to the following United States patents:

U.S. Pat. No. 2,417,819—APPARATUS FOR JOINING WIRES AND THE LIKE BY FUSION, Gilbert Gilliver;

U.S. Pat. No. 3,089,020—INDIRECT WELDING, Richard P. Hurlebaus;

U.S. Pat. No. 3,342,972—WELDING ELECTRODE ASSEMBLY, Mortimer Penberg;

U.S. Pat. No. 3,369,102—EXPOSIVE RIVET DETONATING RIVET TOOL, Theodore M. Jacobs;

U.S. Pat. No. 3,596,044—THROUGH INSULATION WELDING SYSTEM, Leonard Katzin;

U.S. Pat. No. 3,912,900—METHOD FOR FEEDING WIRE FOR WELDING, James C. Arnett;

U.S. Pat. No. 4,110,593—WELDING GUN ADAPTED TO WELD MOVABLE CONTACTS ON WIRE SPRING RELAYS, Crooks et al.;

U.S. Pat. No. 4,171,477—MICRO-SURFACE WELDING, Joseph Funair.

SUMMARY AND OBJECTS OF THE INVENTION

Accordingly, the present invention has for an important object to provide a wire-welding apparatus which allows for a continuous insulated wire to be welded in a precise manner to numerous terminal pins of a circuit board without damage to the wire, and wherein the apparatus further provides a simple handheld welding tool that overcomes the problems existing with the present known wire-welding tools.

Another object of the present invention is to provide a wire-welding apparatus that is capable of bonding Teflon-insulated nickel wire to stainless-steel terminal pins (ranging in size from 0.040" diameter to 0.125" diameter across the bonding surfaces thereof), using a fusion-melding, resistance-welding process.

Still another object of the invention is to provide a hand-held, wire-welding apparatus that is entirely self-contained and fully portable, and that is quick and easy to operate and capable of delivering repeatably consistent optimum results, as required by currently existing stitch-wiring practices.

A further object of the present invention is to provide a wire-welding apparatus which defines a stitch gun that eliminates the upper and lower weld-head assemblies, and provides all power and pressure via one unit, the wire being fed through the center of a coaxial dual electrode assembly. The bonding current is conducted through an inner electrode, which is springloaded to pierce the wire's insulation at the proper pressure. The current passes from the inner electrode through the wire, into the terminal pin, and out in series via an outer electrode, which is notched so that it allows the wire to pass through it without making electrical contact. The outer electrode is springloaded, independent of the inner electrode, to provide consistent contact pressure, the electrodes being insulated from one another.

Still a further object of the invention is to provide a wire-welding apparatus of this type that includes an adjustable, pressure-activated, contact switch that fires the power supply as the electrodes are compressed.

A still further object of the invention is to provide an apparatus of this character wherein the insulated wire can be fed down through the center core of the device, and then down through the plug-in outer electrode. If so desired, the wire can also be fed to the workpiece externally of the device.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings which are for illustrative purposes only, and wherein like numerals represent like elements of the invention:

FIG. 1 is a side-elevational view of a wire-welding tool which defines the present invention, the apparatus being shown held in a typical operating position;

FIG. 2 is a longitudinal cross-sectional view taken substantially along line 2—2 of FIG. 1;

FIG. 3 is an enlarged cross-sectional view of the upper portion of the tool with portions thereof shown in full lines;

FIG. 4 is an enlarged cross-sectional view of the midsection of the tool with portions thereof shown in full lines;

FIG. 5 is an enlarged cross-sectional view of the lower end of the tool with portions thereof shown in full lines; and FIG. 6 is a cross-sectional view taken substantially along line 6—6 of FIG. 3 with the terminal-housing cap removed.

DESCRIPTION OF THE PREFERRED EMBODIMENT

Referring more particularly to FIG. 1, there is shown a welding tool, generally indicated at 10, being held in the preferred operational position by hand 12.

The present invention more specifically defines a hand-held welding tool that is designed for attaching insulated wire by employing a fusion-melding, resistance-welding process which is further capable of diffusion bonding or welding of a variety of materials including wire, metal strips, component leads, and other suitable metallic objects, to flat metallic surfaces. However, the present device 10 is particularly suited for welding continuous insulated wire (Teflon-insulated wire) to stainlesssteel terminal pins, ranging in size from 0.040" diameter to 0.125" diameter, across bonding surfaces by using a fusion-melding, resistance-welding process.

Welding tool 10 comprises a hand-holdable housing 14 which is defined by an elongated tubular member having its opposite ends closed. That is, at the upper end of housing 14, a terminal housing (designated generally at 16) is secured thereto; and at the lower end thereof there is attached a nose-block member 18 which provides a means to support and align the combined electrode assemblies 20 and 22, and particularly the outer electrode probe 24 which extends outwardly from nose block 18. This is clearly illustrated in FIGS. 2 and 5.

Hence, the present invention includes a unique and novel arrangement for providing a coaxial, dual-electrode unit having an outer, spring-biased, electrode assembly, generally indicated at 20, and an inner, spring-biased, electrode assembly, designated at 22. Each biased electrode assembly is independent of the other and is insulated from the other, but the assemblies are combined as a single unit within an elongated support tube 25.

Outer, spring-biased, electrode assembly 20 (clearly illustrated in FIG. 5) comprises a removable and adjustable electrode probe 24. It should be noted that various electrode probes are arranged to perform particular welding operations, each probe being provided with an individual, selective, contact end member 26 which is integrally formed as part of the probe head 27. The probe head includes a tubular, extended neck member 28 that is externally threaded so as to be adjustably threaded to an outer electrode sleeve 30. A lock nut 32 is mounted to neck member 28, whereby probe 24 is locked into a selected position. The opposite end of sleeve 30 is formed with a plurality of slots so as to provide a snap-coupling arrangement 33, whereby sleeve 30 is coupled to electrical contact bushing 34, the contact bushing being mounted in nose block 18 which is formed from a plastic material, thereby establishing an insulation between the outer probe assembly 20 and the tool housing 14. An adjustable cap 36 is threadably attached to the lower threaded end of support sleeve 25. A spring follower 38 fomed from an insulating material is slidably positioned within support sleeve 25 and bushing 34. The upper portion 37 of follower 38 is received in sleeve 25 so as to be engaged by spring 40, the lower portion thereof being received in contact bushing 34 through an opening 42 formed in cap wall 44. The downward movement of spring follower 38 is limited by an annular flange 45, while the upward movement created by pressure on electrode probe 24 is limited by the flange 45 striking the lower edge of support tube 25. The upper end of spring 40 engages a spacer 46, as seen in the enlarged cross-sectional view of FIG. 4, the spacer being fixedly secured to sleeve 25 by pins 47.

Accordingly, the biasing force of spring 40 is controlled by the positioning of adjustable cap 36, the longitudinal movement of the outer electrode assembly 20 being independent of the longitudinal movement of the inner electrode assembly 22.

The spring-biased, inner electrode assembly 22 comprises an inner electrode probe 50 formed by two coupled elongated metal tubes 51 and 53. The first tube 51 is formed with a reduced-diameter, contact finger end 52 having a passage to receive a typical insulated wire therethrough. The opposite end of tube 52 is provided with slots to establish a springcoupling end 55 adapted to be received in one end of the second tube 53, as illustrated in FIG. 5. Tube 53 extends upwardly, its upper ends also being formed with a spring-coupling member 56, as illustrated in FIG. 4. Tube 51 is coated with a thin layer of insulation material 54, which is shown in FIG. 5, and is coaxially positioned within outer probe 24 and probe sleeve 30, the inner contact finger end 52 being positioned in a normally retracted arrangement within the outer contact end 26 of probe 24. When downward force is applied to the tool 10, the outer probe assembly will retract before the inner probe finger 52 can engage the insulated wire.

Coupling end 56 of the second inner probe member 53 is adapted to be received in a contact fitting 58 which is interposed between spacer 46 and a second elongated spacer 60 formed from suitable insulation material. A second biasing spring 62 is interposed between spacer 60 and an adjustable follower member 64 which is formed with a sleeve-like body and an enlarged head member 66 that defines shoulder 68. Follower 64 is slidably adjustable by means of screw cap 70 which is threaded to the outer extended end of support tube 25. Cap 70 includes a centrally disposed hole 72 which permits the insulated wire to be fed down through the coaxial bores of the inner electrode assembly 22, so as to extend outwardly from electrode probe 24.

Thus, in order to control the proper amount of force for the engagement of electrode probe 52 with the insulated wire (not shown), cap 70 may be rotated to a selective position, whereby follower 64 is properly positioned against spring 62.

To operate the present welding tool, the end 26 of the outer electrode 24 is applied to the bonding surface at approximately 90°. The wire, lead or strip to be bonded to the surface is properly located between the electrodes and the bonding surface. At this time, the operator presses the device downwardly towards and against the bonding surface until the optimum bonding pressure is achieved. The optimum pressure is defined as that pressure sufficient to break through any insulated materials which may be present, and sufficient to provide adequate electrical contact between the electrode, wire (or lead or strip), and the bonding surface. The pressure must not be so great as to unduly deform or damage the bonding surface or the element being welded thereto. Thus, each electrode assembly is provided with its own pressure-adjustment means, as heretofore described.

When sufficient pressure is achieved, pressure-sensitive switch, generally designated at 75, is activated—thereby causing a welding or melding current pulse to be supplied to the electrodes 24 and 50 by means of a suitable power supply (not shown). The operator then lifts the tool from the bonding surface and moves it to the next desired bonding location, repeating the operation.

Pressure-sensitive switch 75 comprises a contact element 76 which is secured to the insulated spacer 60, as shown in FIG. 3. Contact element 76 is located in an enlarged slot formed in support tube 25, and is arranged to have wire 78 connected thereto. Wire 78 passes up through terminal housing 16, as seen in FIGS. 3 and 6. A second wire 79 is attached to an override-slide contact pin 80 which is mounted to the base 82 of housing 16. Pin 80 is spring-loaded so as to be fully extended in a normal open mode, as indicated in FIG. 2, and to be retracted in a contact closed mode, indicated in FIG. 3. The firing circuit is activated as the inner electrode assembly is forced upwardly, allowing contact member 76 to engage contact pin 80 and thereby closing the firing circuit (not shown).

Contact pin 80 is so designed as to provide overtravel in the event the operator continues to apply downward force to the tool after the firing pulse is initiated. Such an overtravel prevents a continuous firing pulse and damage to the workpiece.

Power-supply lines 84 and 86 are also mounted to base 82, as illustrated in FIG. 6. Line 84 is connected to wire 87 which extends downwardly within housing 14 and is secured to contact fitting 58, which is part of the inner electrode assembly, thus providing current thereto. Line 86 is connected to wire 88, which is secured to contact bushing 34 that provides current from the power supply to the outer electrode assembly.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to restricted to the specific form shown or uses mentioned, except as defined in the accompanying claims.

I claim:

1. A welding device adapted to be hand-held for forceable engagement with a workpiece, and adapted to be electrically connected to an external power supply, wherein said device comprises:

an outer tubular housing having a terminal-head member mounted to one end thereof, and a nose block mounted to the opposite end thereof;

an elongated support tube, the upper end thereof being mounted and secured in said terminal head so as to extend inwardly within said tubular housing;

an adjustably biased, outer, electrode assembly slidably attached to the lower end of said support tube, whereby the contacting end of said outer electrode assembly extends outwardly from said nose block;

a first adjustable biasing means mounted within and to said support tube, and positioned for engagement with said outer electrode assembly;

wherein said first adjustable biasing means comprises:

a spacer member fixed within said support tube;

a spring follower slidably mounted within said support tube and formed from an electrical insulation material;

a spring interposed between said fixed spacer member and said slidable spring follower; and a cap member adjustably threaded to one end of said support tube and adapted to engage said spring follower so as to adjust the biasing force of said spring, and wherein said outer electrode assembly engages said spring follower to force said outer electrode assembly outwardly from said nose block;

an adjustably biased, inner, electrode assembly slidably positioned within said support tube, and coaxially within said outer electrode assembly, and electrically insulated therefrom;

a second adjustable biasing means mounted in said support tube and positioned for engagement with said inner assembly; and an override, pressure-activated, switch means mounted in said terminal head and positioned within said tubular housing to be pressure activated by the sliding movement of said inner electrode assembly, when said electrode assemblies are forceably engaged with the bonding surface of a workpiece.

2. A welding device as recited in claim 1, wherein said second adjustable biasing means comprises:
   an elongated, insulated spacer member slidably mounted in said support tube, one end thereof being in engagement with said inner electrode assembly;
   a screw cap mounted to the opposite end of said support tube and positioned above said terminal housing, said screw cap having a central hole formed therein;
   a spring follower slidably positioned within said support tube and in engagement with said screw cap;
   a spring interposed between said spring follower and said insulated spacer member, whereby the adjustment of said screw cap determines the biasing force placed on said inner electrode assembly.

3. A welding device as recited in claim 2, wherein said outer electrode assembly comprises:
   an electrical contact bushing mounted within said nose block and electrically connected to a first cable from said external power supply;
   an outer electrode sleeve slidably mounted in said nose block, one end thereof being formed to electrically engage said contact bushing and said spring follower of said first adjustable biasing means, the opposite free end of said outer electrode sleeve being positioned to project outwardly from said nose block; and
   an outer electrode probe removably mounted to said free end of said outer electrode sleeve, whereby current flow from said contact bushing flows through said outer electrode sleeve to said outer electrode probe.

4. A welding device as recited in claim 3, wherein said inner electrode assembly comprises:
   an inner electrode probe having a probe contact end coaxially aligned in said outer electrode probe and slidable with respect thereto, and an oppositely disposed coupling end, said inner electrode probe being electrically insulated from said outer electrode probe; and
   an electrical contact fitting interposed between said elongated, insulated spacer member and said inner electrode probe, and slidably mounted within said support sleeve and electrically connected to a second cable from said external power supply.

5. A welding device as recited in claim 4, wherein said inner electrode probe comprises:
   a first tube member having said probe contact end formed thereon;
   an insulation material formed on said first tube member, including said contact end thereof; and
   a second tube member removably connected to said first tube member at one end thereof, the opposite end thereof being removably connected to said electrical contact fitting.

6. A welding device as recited in claim 4, wherein said override, pressure-activated switch means comprises:
   a spring-loaded contact pin mounted to said terminal head and adapted to be connected to a first wire of a firing circuit of said power supply; and
   a contact element mounted to said insulated spacer of said inner electrode assembly so as to move with said insulated spacer as said electrode probes engage said workpiece, said contact element adapted to be connected to a second wire of said firing circuit.

* * * * *